United States Patent Office 3,285,939
Patented Nov. 15, 1966

3,285,939
STEROIDAL 3-CHLORO-3,5-DIENES
George W. Moersch and Winifred Ann Neuklis, Ann Arbor, Mich., assignors to Parke, Davis & Company, Detroit, Mich., a corporation of Michigan
No Drawing. Filed Feb. 13, 1963, Ser. No. 258,157
5 Claims. (Cl. 260—397.4)

The present invention relates to novel steroid compounds and to methods for their production. More particularly, the invention relates to steroidal 3-chloro-3,5-dienes having the formula

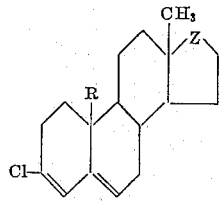

where R is hydrogen or methyl, and Z represents

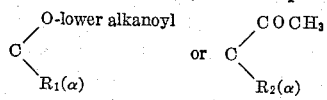

where $R_1(\alpha)$ is hydrogen, methyl, or ethinyl and $R_2(\alpha)$ is hydrogen, hydroxyl, or lower alkanoyloxy.

In accordance with the invention, compounds of the above formula are prepared by the reaction of a steroid compound having the formula

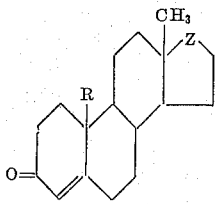

with a chlorinating agent in a neutral, anhydrous organic solvent; where R and Z are defined as given above. Chlorinating agents which may be used include phosphorus pentachloride, phosphorus oxychloride, acetyl chloride, and oxalyl chloride; of these, phosphorus oxychloride and oxalyl chloride are preferred. Suitable solvents for the reaction are aromatic hydrocarbons, such as benzene and toluene, halogenated hydrocarbons, such as chloroform, and trichloroethylene, tertiary amides, such as dimethylformamide, and mixtures of these. Preferred solvents are benzene and dimethylformamide. The temperature may be varied over a wide range from 20° C. to 100° C., with a temperature in the range 40°–80° C. being preferred. The reaction is normally completed in 2 to 4 hours, although the time may be varied from 1 to 24 hours, depending on the temperature employed. While equivalent amounts of reactants may be used, an excess of either reactant is not harmful. It is preferable to use the chlorinating agent in slight excess.

Also in accordance with the invention, steroidal 3-chloro-3,5-diene compounds having the formula

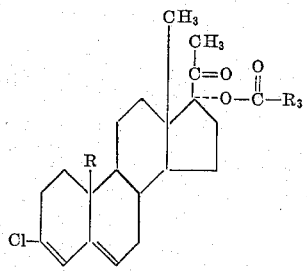

are prepared by reacting a steroid compound of the formula

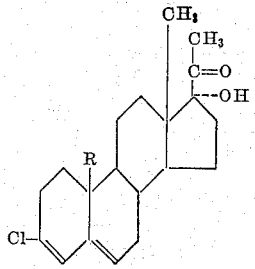

with an acylating agent of the formula

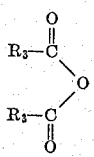

where R is hydrogen or methyl and $R_3$ is a lower alkyl radical of not more than three carbon atoms. The reaction may be carried out with or without a solvent. The preferred solvent is the acid corresponding to the anhydride acylating agent; e.g., when the acylating agent is acetic anhydride, the solvent of choice is acetic acid. In the absence of a solvent, a several-fold excess of the acylating agent is employed. The temperature and duration of the reaction are not critical and may be varied over a wide range; it is most convenient to carry out the reaction under reflux for 10 to 18 hours. At room temperature, longer periods of time, up to 24 hours, may be required. It is preferable to add an acidic catalyst, such as p-toluenesulfonic acid, sulfuric acid, or anhydrous hydrogen chloride, when the reaction is conducted at room temperature. The preferred acid catalyst is p-toluenesulfonic acid.

The compounds of the invention are useful pharmacological agents, exhibiting anabolic, progestational, and anti-fertility activity. They may be administered orally or parenterally. The preferred compound for use as an anabolic agent is 3 - chloro - 17α - methyl - 17β - acetoxy-androsta-3,5-diene. As progestational agents, the preferred compounds are 3-chloro-17α-ethinyl-17β-acetoxy-19 - norandrosta - 3,5 - diene and 3 - chloro-17α-acetoxy-pregna-3,5-dien-20-one. As anti-fertility agents, the preferred compounds are 3-chloro-17α-ethinyl-17β-acetoxy-19 - norandrosta - 3,5 - diene and 2-chloro-17α-hydroxy-pregna-3,5-dien-20-one.

The invention is illustrated by the following examples:

Example 1

A solution of 1.0 g. of 19-nortestosterone acetate in 25 ml. of dry benzene is cooled in an ice bath, 6 ml. of oxalyl chloride is added, and the mixture is kept at room temperature overnight. The solution is then evaporated to dryness under reduced pressure at 40–55° C., and the residue is warmed with 5% aqueous sodium bicarbonate solution. After cooling in an ice bath, there is obtained 3-chloro-17β-acetoxy-estra-3,5-diene, a yellow crystalline solid (plates), M.P. 118–120° C., after two crystallizations from acetone-methanol.

Example 2

A solution of 3.0 g. of 17α-methyl-17β-acetoxy-5α-androst-4-en-3-one in 70 ml. of dry benzene is treated with 12 ml. of oxalyl chloride, and the resulting mixture is allowed to stand at room temperature overnight. The solution is then evaporated to dryness under reduced pressure at 50° C. The yellow oily residue is warmed on the steam bath with 50 ml. of saturated aqueous sodium bicarbonate solution, the mixture is diluted with an equal volume of water and allowed to cool. The solid 3-chloro-17α-methyl-17β-acetoxy-androsta-3,5-diene is isolated by filtration, washed with water, and dried in vacuo at 50° C. The product is washed with 20 ml. of cold methanol, and crystallized twice from methanol; M.P. 125–127° C.

The same product can also be prepared in the following manner: A solution of 1.94 g. of 17α-methyl-17β-acetoxy - 5α - androst-4-en-3-one in 20 ml. of dimethylformamide is added dropwise with stirriing at room temperature over a period of 30 minutes to a reagent prepared by adding 0.55 ml. of phosphorus oxychloride to 2 ml. of dimethylformamide at a temperature below 20° C. The mixture is then heated at 60–80° C., for 2½ hours with continuous stirring. After cooling in ice, the mixture is treated with a solution of 2.9 g. of sodium acetate in 7.5 ml. of water, and the resulting mixture is heated at 60–80° C. for 30 minutes. Water (40 ml.) is added to the cooled mixture, the aqueous layer is decanted, and water (50 ml.) is again added to the gummy residue. The aqueous mixture is extracted with 250 ml. of ether, and the ether solution is washed first with a saturated aqueous sodium bicarbonate solution, then with water. After drying over anhydrous sodium sulfate, the ether solution is evaporated to dryness, the yellow gummy residue is triturated with methanol, and the solid obtained is isolated by filtration, washed with ether, and crystallized twice from methanol to give 3-chloro-17α-methyl-17β-acetoxy-androsta-3,5-diene.

Example 3

A solution of 2.0 g. of ethisterone acetate in 20 ml. of dimethylformamide is added dropwise with stirring at room temperature over a period of 30 minutes to a reagent prepared from 0.55 ml. (0.92 g.) of phosphorus oxychloride and 2.0 ml. of dimethylformamide. The dark red solution is then stirred and heated at 60–80° C. for two hours. After cooling in ice, a solution of 2.66 g. of sodium acetate in 7 ml. of water is added, and the resulting mixture is heated at 70–75° C. for 30 minutes. Water (200 ml.) is added, the cooled mixture is extracted with ether, and the ether solution is dried over anhydrous magnesium sulfate. Upon evaporation of the solvent, there is obtained 3-chloro-17α-ethinyl-17β-acetoxy-androsta-3,5-diene; pale yellow crystals, M.P. 181–184° C., after crystallization from heptane-acetone.

Example 4

A solution of 3.86 g. of testosterone propionate in 40 ml. of dimethylformamide is added dropwise with stirring at room temperature over a period of 40 minutes to a reagent prepared from 1.1 ml. of phosphorus oxychloride and 6 ml. of dimethylformamide, and the reaction mixture is heated at 55–80° C. for 2½ hours. After cooling to room temperature, a solution of 6 g. of sodium acetate in 16 ml. of water is added dropwise with stirring, and the resulting mixture is heated at 60–80° C. for 30 minutes. The mixture is then cooled in ice and the solid 3-chloro-17β-propionoxy-androsta-3,5-diene obtained is isolated, washed first with water, then with 5% aqueous sodium bicarbonate, and again with water. After drying in vacuo at 50–60° C. and trituration with methanol, the product is crystallized from acetone-methanol; M.P. 170–172° C.

Example 5

A mixture of 2.0 g. of norethisterone acetate and 11 ml. of oxalyl chloride in 50 ml. of anhydrous benzene is allowed to stand at room temperature overnight. The solution is then evaporated to dryness under reduced pressure at 50–60° C. The residue of yellow oil is warmed with 5% aqueous sodium bicarbonate, the mixture is cooled in ice, and the solid 3-chloro-17α-ethinyl-17β-acetoxy-19-norandrosta-3,5-diene obtained is isolated, crushed, washed with water, and recrystallized several times from methanol; M.P. 138–140° C.

Example 6

A mixture containing 1.0 g. progesterone, 3.0 ml. of oxalyl chloride, and 20.0 mg. of oxalic acid in 25 ml. of anhydrous benzene is stirred at room temperature for 16 hours. The solution is then evaporated to dryness under reduced pressure, and the residue is crystallized, first from a mixture of ether and petroleum ether, and then from methanol to give 3-chloro-pregna-3,5-diene-20-one, M.P. 124–126° C.

The same product can also be prepared in the following manner: A solution of 1.76 g. of progesterone in 20 ml. of dimethylformamide is added dropwise with stirring at room temperature over a period of 30 minutes to a reagent prepared from 0.5 ml. of phosphorus oxychloride and 2.0 ml. of dimethylformamide. The red solution is then stirred and heated at 60–80° C. for 2½ hours. The solution is cooled in ice, a solution of 2.9 g. of sodium acetate in 7.5 ml. of water is added, and the resulting mixture is heated at 60–75° C. for 30 minutes. Water (40 ml.) is added, the cooled mixture is extracted with ether, and the ether solution is washed first with a saturated aqueous sodium bicarbonate solution, then with water. After drying, the ether solution is evaporated to dryness, the gummy residue is solidified by slurrying with warm methanol, and the solid 3-chloro-pregna-3,5-dien-20-one obtained is isolated and recrystallized twice from methanol.

Example 7

A solution of 1.85 g. of 17α-hydroxyprogesterone in 25 ml. of dimethylformamide is added dropwise with stirring at room temperature over a period of 40 minutes to a reagent prepared from 0.55 ml. of phosphorus oxychloride and 3 ml. of dimethylformamide. The red solution is then stirred and heated at 60–70° C. for 2 hours. After cooling in ice, a solution of 3 g. of sodium acetate in 10 ml. of water is added and the resulting mixture is heated at 60–70° C. for 30 minutes. Water is added to the cooled mixture until precipitation begins, and the aqueous mixture is chilled in ice for 10 minutes. The solid precipitate is isolated, washed with water, and dried in vacuo at 40–50° C. After trituration with 10 ml. methanol and filtration, the solid 3-chloro-17α-hydroxy-pregna-3,5-dien-20-one obtained is crystallized from methanol-acetone; M.P. 199–201° C.

By employing the above procedure, 1.0 g. of 17α-acetoxyprogesterone in 30 ml. of dimethylformamide is treated with a reagent prepared from 0.3 ml. of phosphorus oxychloride and 3 ml. of dimethylformamide to prepare 3-chloro-17α-acetoxy-pregna-3,5-dien-20-one.

Example 8

A solution of 2.65 g. of 3-chloro-17α-hydroxy-pregna-3,5-dien-20-one in 165 ml. of acetic acid is treated with 25 ml. of acetic anhydride and 2.65 g. of p-toluenesulfonic acid monohydrate and the mixture is kept at room temperature overnight. The reaction mixture is then poured into 1000 ml. of ice-water with shaking, and the precipitated 3-chloro-17α-acetoxy-pregna-3,5-dien-20-one is isolated by filtration and washed first with water, then with 5% aqueous sodium bicarbonate. After drying in vacuo at 50–60° C. and two crystallizations from aqueous methanol, there is obtained pure 3-chloro-17α-acetoxy-pregna-3,5-dien-20-one, M.P. 182–185° C.

In the foregoing procedure, by the substitution of 165 ml. of propionic acid and 25 ml. of propionic anhydride for acetic acid and acetic anhydride, respectively, there is obtained 3-chloro-17α-propionoxy-pregna-3,5-dien-20-one.

We claim:
1. Steroidal 3-chloro-3,5-dienes having the formula

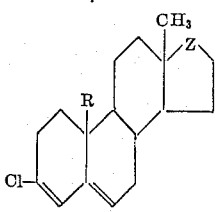

where R is chosen from the group consisting of hydrogen and methyl, and Z represents a member of the class consisting of

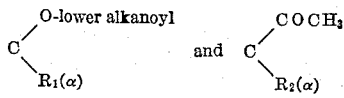

where $R_1(\alpha)$ is chosen from the group consisting of methyl, and ethinyl and $R_2(\alpha)$ is chosen from the group consisting of hydrogen, hydroxyl, and lower alkanoyloxy.

2. 3 - chloro - 17α - methyl - 17β - acetoxy - androsta-3,5-diene.
3. 3 - chloro - 17α - ethinyl - 17β - acetoxy - 19 - norandrosta-3,5-diene.
4. 3-chloro-17α-hydroxy-pregna-3,5-dien-20-one.
5. 3-chloro-17α-acetoxy-pregna-3,5-dien-20-one.

References Cited by the Examiner

UNITED STATES PATENTS 2,891,079 6/1959 Dodson et al. _____ 260—397.4
3,129,233 4/1964 Deghenghi _____ 260—397.5

OTHER REFERENCES

Chlorinating Agents, Hooker Chemical Corporation Technical Bulletin No. 328–B, p. 12, 1959.

LEWIS GOTTS, *Primary Examiner.*

T. M. MESHBESHER, *Assistant Examiner.*